United States Patent [19]

Kaufeldt, deceased et al.

[11] Patent Number: 4,574,446
[45] Date of Patent: Mar. 11, 1986

[54] METHOD AND A DEVICE FOR ENABLING RAPID ATTENUATION AND SUBSEQUENT SECURING OF SPOKES TO BE MOUNTED IN A SPOKE WHEEL

[75] Inventors: Roland Kaufeldt, deceased, late of Tyreso, Sweden; by Per-Ola Persson, executor, Stockholm, Sweden

[73] Assignee: Monark-Crescent AB Fack, Varberg, Sweden

[21] Appl. No.: 658,617

[22] Filed: Oct. 9, 1984

[30] Foreign Application Priority Data

Oct. 13, 1983 [SE] Sweden .............................. 8305622

[51] Int. Cl.$^4$ ................................................ B21K 1/34
[52] U.S. Cl. ................................. 29/159.02; 29/802; 157/1.55
[58] Field of Search ............................ 29/159.02, 802; 157/1.5, 1.55

[56] References Cited

U.S. PATENT DOCUMENTS

| | | | |
|---|---|---|---|
| 3,758,931 | 9/1973 | Patterson | 29/159.02 |
| 3,908,729 | 9/1975 | Carminati | 157/1.5 |
| 4,062,095 | 12/1977 | Storz | 29/802 |
| 4,187,895 | 2/1980 | Saruwatari et al. | 157/1.55 |
| 4,427,047 | 1/1984 | Guillermeir | 157/1.5 |
| 4,505,315 | 3/1985 | Kaufeldt | 29/159.02 |

Primary Examiner—Howard N. Goldberg
Assistant Examiner—P. W. Echols
Attorney, Agent, or Firm—Laff, Whitesel, Conte & Saret

[57] ABSTRACT

The invention concerns a method and a device for attenuating oscillating movements and clamping in a predetermined position one end of a freely depending spoke for example when mounting spoke wheels. The free end of the spoke is permitted to slide into a slot which includes an energy attenuating structure which the spoke passes. When the free end of the spoke thereupon exits from the slot it is intercepted by a magnet and thereafter guided to a securing device by which it is clamped.

7 Claims, 2 Drawing Figures

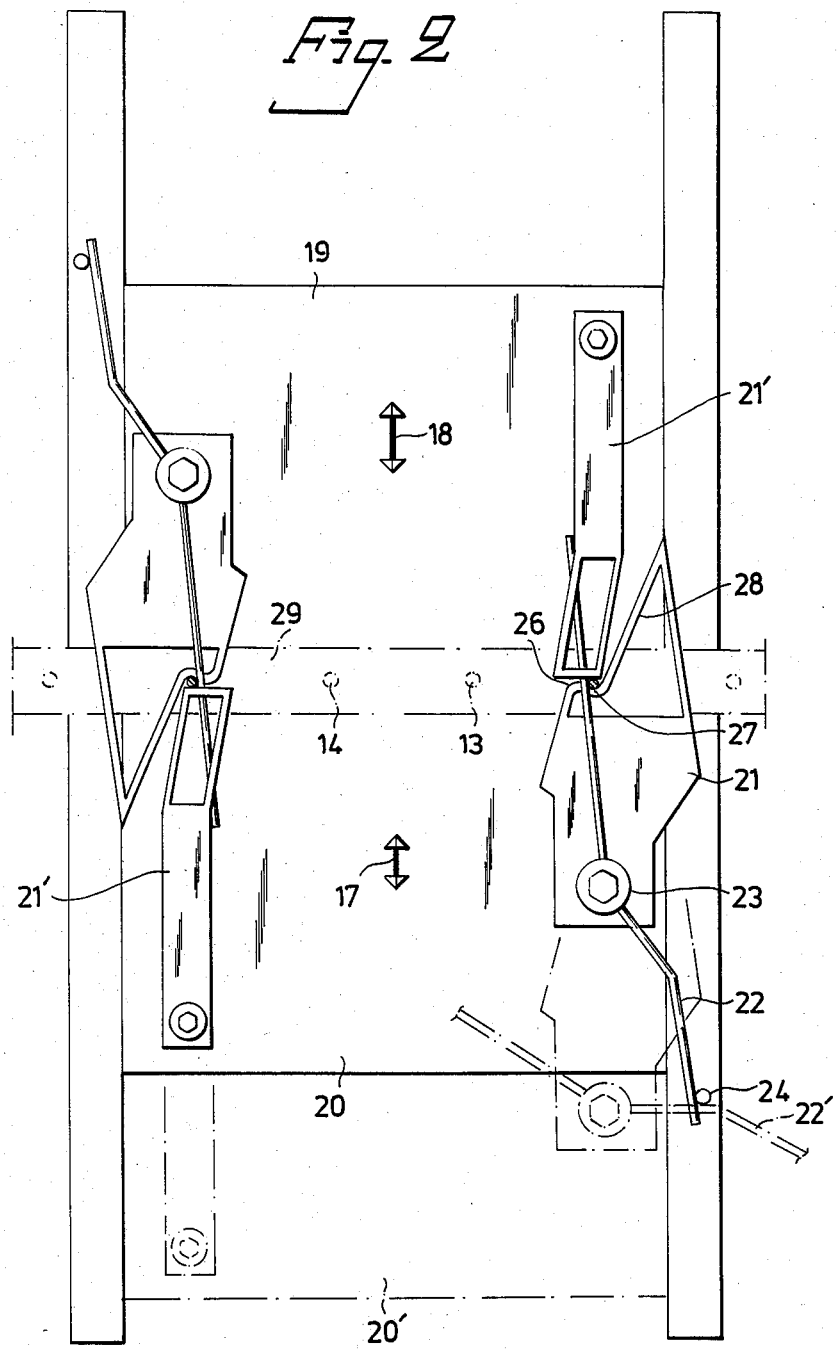

METHOD AND A DEVICE FOR ENABLING RAPID ATTENUATION AND SUBSEQUENT SECURING OF SPOKES TO BE MOUNTED IN A SPOKE WHEEL

BACKGROUND OF THE INVENTION

1. Field of the Invention

The present invention concerns a method and a device for enabling rapid attenuation and subsequent securing of spokes to be mounted in a spoke wheel, wherein the mounting is carried out with the spokes in such position that spoke nipples can be screwed onto the free ends of the respective spokes from the opposite side of the rim of the spoke wheel to the side on which the spoke hub is located.

2. Description of the Prior Art

In mounting for example bicycle wheels it is possible to proceed by introducing two spokes through the lower aperture in each spoke flange of a spoke hub whose wheel shaft is horizontal. The free ends of the spokes will then depend substantially vertically under the influence of gravity. However, if the hub is disposed in the center of a wheel rim and the hub and wheel rim are to be interconnected by means of spokes in the manner disclosed above the free ends of the spokes will oscillate and will not immediately become positioned opposite to corresponding apertures in the rim. Thus, the oscillatory movement of the spokes must be stopped and they have to be secured in proper position in order to be provided with a spoke nipple which is introduced through the corresponding aperture of the wheel rim.

SUMMARY OF THE INVENTION

The present invention has for its purpose to enable the above-indicated object to be achieved. More specifically, the invention concerns a method and a device for attenuating oscillation movements and clamping in a predetermined position one end of a freely depending spoke for example when mounting spoke wheels. The free end of the spoke is permitted to slide into a slot which includes an energy attenuating structure through which the spoke passes. When the free end of the spoke thereupon exits from the slot, it is intercepted by a magnet and thereafter guided to a securing device by which it is clamped.

The present invention has for its purpose to enable the above-indicated object to be achieved. The means by which this is carried out are disclosed in the accompanying claims.

BRIEF DESCRIPTION OF THE DRAWINGS

The invention will be described more in detail in the following description with reference to the accompanying drawing in which

FIG. 2 shows a device which may cooperate with the device of FIG. 1 and which has for its purpose to secure the spokes in position above corresponding apertures in the wheel rim. The same reference numerals have been utilized in the two figures wherever possible.

DETAILED DESCRIPTION

Figure 1:
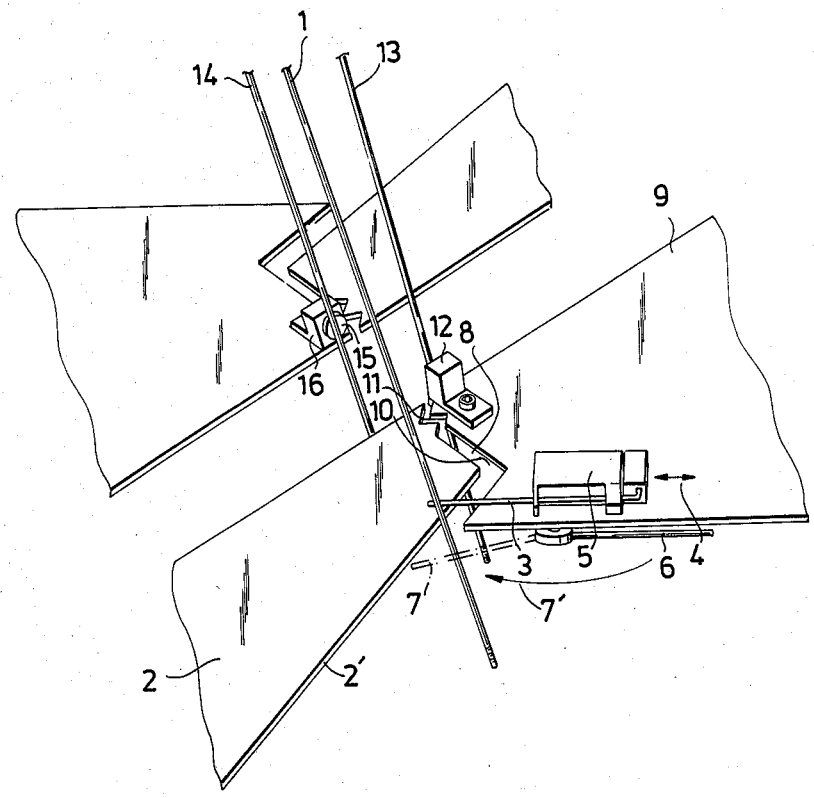
FIG. 1 illustrates an embodiment of an attenuation device for spokes which have been introduced into a wheel hub and which depend freely with their free ends in accordance with the invention.

FIG. 1 comprises two essentially similar structures of which only one will be described in detail as the other one is embodied similarly and operates similarly. In FIG. 1 the designation 1 more specifically refers to a spoke which has been introduced through an aperture in a spoke hub (not shown) and the free end of which has swung down in consequence of the tendency of the spoke to hang vertically. However, in this swing-down movement the spoke is guided along one edge 2' of a guide plate 2 towards a catch pin 3 which may be adjusted in the direction of the two-headed arrow 4 by for example a pneumatically or electrically operating adjusting device 5.

In order to make it possible to ascertain that a spoke 1 actually is in place a sensing pin 6 is utilized which may be swung forward to the dot-dash position 7 in a motion according to arrow 7' as verification.

So that the spoke may reach its intended position without oscillating after catch pin 3 has been withdrawn and thus has given access to a slot 8 between plate 2 and a plate 9 cooperating therewith, the spoke may swing into said slot 8 which in the illustrated embodiment forms an angle at portion 10 and also is provided with an energy attenuator in the form of a zigzag portion 11 which preferably may be located at the end of the slot in the manner shown by FIG. 1. When spoke 1 exits from zigzag portion 11 it is immediately intercepted by a small permanent magnet in a bracket 12 so as to take the position which is indicated by designation 13. Said permanent magnet is not visible in FIG. 1, but in the above-mentioned similar arrangement of the opposite side of the spokes a similar procedure is carried out with the relevant spoke located on that side and designated 14 being held firmly by a permanent magnet 15 which is mounted in a bracket 16. Thus, brackets 12 and 16 are identical and each one of them is provided with a permanent magnet corresponding to magnet 15.

It may be mentioned that even if spokes of stainless steel are used the latter will be held firmly by the permanent magnets.

The continued procedure is illustrated in FIG. 2 wherein the designations 13 and 14 refer to spokes 13 and 14 set to the position just described in FIG. 1, thus with their lower portions held firmly by the permanent magnets.

FIG. 2 generally shows a device which is intended to be placed below the device of FIG. 1 and which comprises two slides 19 and 20 located in the same plane and adjustable in the directions of the two-headed arrows 17 and 18, said slides being mutually similar and supporting two similar elements, viz. on one hand (marked by a digit in the lower portion of the figure) a spoke interception member 21 and on the other hand a spoke clamping member 21' cooperating therewith, said spoke interception member on one slide cooperating with the spoke clamping member on the other slide and vice versa.

The interception member includes a bent wire 22 which may be rotated in the plane of the drawing around a shaft 23 disposed at right angles to the plane of the drawing. In order that this rotation may be achieved one end of wire 22 is guided against a pin 24. This is illustrated by wire 22 set to the dot-dash position 22' in which it may be seen that when slide 20 is slid from the dot-dash position 20' wire 22 will be rotated from position 22' to position 22 which is illustrated by solid lines. The portion of the wire disposed on the opposite side of shaft 23 will simultaneously be made to engage spoke 13 and to guide the lower portion thereof to a position in which it engages interception member 21 which at its outer end is provided with a smoothly rounded portion 26 which merges into a recess 27 which in turn merges into a linear portion 28, with said rounded portion, recess and linear portion, respectively, being of such shape that spoke 13 will be introduced into recess 27 wherein it is secured by clamping member 21' on the opposite slide being made to engage the spoke with its outer end so as to secure the spoke when said opposite slide is advanced. In this manner the spoke will have been guided into proper position over a nipple aperture (not illustrated) in wheel rim 29 which is indicated by dot-dash lines. Thus, a nipple may now be introduced through the nipple aperture from the opposite side of rim 29 and be screwed onto the spoke.

In consequence of the interaction occurring between the interception members and the clamping members on the two slides 19 and 20 the two spokes will be set simultaneously in their proper positions each above an individual nipple aperture in the wheel rim.

The invention is not limited to the embodiment described above and illustrated in the drawing, and a number of different modifications can be made for achieving the same result.

I claim:

1. A method of attenuating an oscillating movement and clamping in a predetermined position the free end of at least one spoke which after having been introduced through a spoke aperture at the bottom of a spoke hub depends freely under the influence of gravity, comprising
  (a) guiding said free end of the spoke into a slot which includes an energy attenuating structure so that said free end of the spoke exits from the slot with a continued attenuated movement,
  (b) intercepting said exiting free end of said spoke by a magnet, and
  (c) guiding the intercepted free end of said spoke to a securing device for clamping said free end of said spoke in an intended position.

2. A method in accordance with claim 1, wherein said energy attenuating structure comprises a zigzag portion located at the exit end of said slot.

3. A method in accordance with claim 1, comprising guiding said intercepted free end of said spoke to said securing device by means of a rotatable wire-shaped member, said wire-shaped member conveying in a rotational movement the spoke to a position in which it is clamped by interaction between two members disposed each on individual slides located under said free end of said spokes, said slides being displaceable towards and away from each other, respectively, in the same plane.

4. A device for attenuating an oscillating movement and for clamping in a predetermined position the free end of at least one spoke which after having been introduced through a spoke aperture at the bottom of a spoke hub depends freely under the influence of gravity, comprising
  two plates,
  said plates being located in the same plane and having a slot which is open at both of its ends disposed between said plates,
  means for attenuating the movement of a spoke moving in said slot,
  said attenuating means being located at an exit end of said slot, and
  a permanent magnet,
  said permanent magnet being disposed immediately outside of the exit end of said slot.

5. A device in accordance with claim 4, said device comprising
  a catch member,
  said catch member being adjustable for blocking the access of said spoke to said slot at the entrance to said slot.

6. A device in accordance with claim 5, said device comprising
  a sensing member,
  said sensing member cooperating with said catch member at the entrance of said slot for sensing whether a spoke is located at the entrance of said slot.

7. A device in accordance with claim 4, said device comprising
  two slides,
  said slides being located in one and the same plane and being displaceable in their longitudinal directions below said two plates,
  and clamping members,
  said clamping members cooperating mutually and being positioned on the respective slides for clamping a spoke between them when the slides are displaced towards each other.

* * * * *